UNITED STATES PATENT OFFICE.

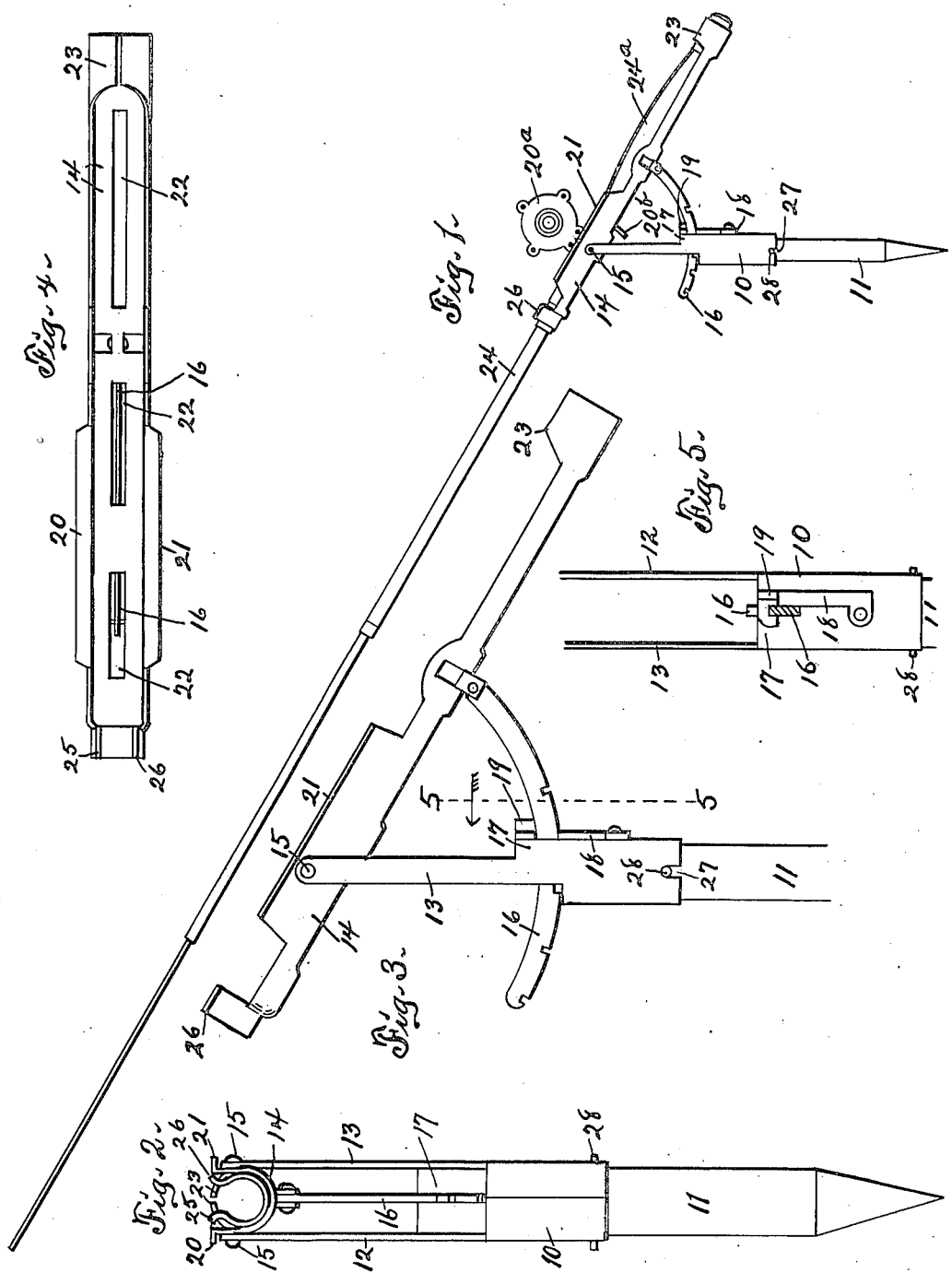

FRIEDRICH W. WITTKOWSKI, OF DES MOINES, IOWA.

FISHING-ROD HOLDER.

1,256,191.      Specification of Letters Patent.      Patented Feb. 12, 1918.

Application filed December 2, 1916. Serial No. 134,555.

*To all whom it may concern:*

Be it known that I, FRIEDRICH W. WITT-KOWSKI, citizen of the United States of America, and resident of Des Moines, Polk county, Iowa, have invented a new and useful Fishing-Rod Holder, of which the following is a specification.

The object of this invention is to provide means for holding a fishing rod or pole during the operation of fishing.

A further object of this invention is to provide means for setting a fishing rod or pole so that the same cannot be detached by draft of a fish in any direction.

A further object of this invention is to provide means for adjusting the inclination of a set fishing rod or pole.

A further object of this invention is to provide means for setting a fishing rod or pole in such position as to be convenient to the hand of the user or fisherman and easily removed by him for playing or killing the fish.

A further object of this invention is to provide means for engaging a reel on a fishing rod or pole so as to prevent rocking or oscillation of the rod laterally in the holder.

My invention consists in the construction, arrangement and combination of elements hereinafter set forth, pointed out in my claims and illustrated by the accompanying drawing, in which—

Figure 1 is a side elevation showing my device mounted for practical use. Fig. 2 is an end elevation and Fig. 3 a side elevation of the device, on an enlarged scale. Fig. 4 is a plan of the device. Fig. 5 is a vertical section on the line 5—5 of Fig. 3. Figs. 2, 3, 4 and 5 are on the same scale.

This application is a continuation, as to certain common subject matter, of my application filed April 5, 1916, serially numbered 89,179 and allowed October 4, 1916.

In the construction of the device as shown the numeral 10 designates a socket, preferably cylindrical in form, adapted to be mounted removably and replaceably in any suitable location such as on a stake 11 adapted to be stuck in the beach, shore, bank or bed of a stream or other body of water or in the gunwale of a boat afloat on said stream or in a crevice of a dock, quay, wharf or pier, over or contiguous to water selected for fishing. Opposite arms 12, 13 are formed on and extend from the upper end of the socket 10 and form a yoke. A trough 14 is arranged between the outer ends of the arms as by pins or rivets 15. The axis of articulation of the trough and yoke preferably is located approximately midway of the center and outer end of said trough and a segmental rack 16 is pivoted at one end to and beneath the trough, at a point approximately midway of the yoke and rear end of said trough. The rack 16 extends through a notch in a lip 17 formed on the upper end of the socket 10, beneath the trough and engages, by notches in its convex margin, with said lip. The trough 14 may be adjusted and set at any desired inclination relative to the socket 10 by adjustment of the rack 16 on the lip 17. The rack is held normally in engagement with the lip 17 by a hooked detent 18 pivoted on the socket and adapted to engage over the rack, said detent being formed with a lug 19 adapted for manual engagement to oscillate the detent between open and closed positions. The trough 14 is generally concavo-convex in cross-section and is provided with opposite ears 20, 21 on its side margins adapted to engage a reel 20ª on opposite sides of a pole 24 carrying said reel, and prevent lateral oscillation of said pole in the trough. The trough preferably is formed with alining slots 22 in its bottom for the purpose of lightening and preventing the accumulation of dirt therein, and also to permit the rack 16 to be turned into the trough for transportation and storage. A finger piece 20ᵇ is formed on the grip 24ª of the pole or rod 24 immediately at the rear of the reel and projects laterally through one of the slots in the bottom of the trough. By this means provision is made for accommodating the finger piece on the grip and at the same time said finger piece serves the additional function of steadying the grip of the rod or pole in its seat in the trough and supplements the function of the ears 20, 21 and the reel in preventing lateral oscillation of the rod in the trough. The trough is formed with a collar or ferrule 23 at its rear end adapted to receive and retain the butt of a fishing rod or pole 24 and limit rearward movement of said rod. The trough is formed with opposing slightly converging lugs 25, 26 at and extending upwardly from its forward end, which lugs together form a fork or clamp partially embracing the rod or pole 24. When a rod as shown is used, the lugs 25, 26 embrace the forward socket of the grip piece or handle and prevent forward movement of the rod relative to the trough.

When the rod or pole is mounted as shown and described, the same cannot be withdrawn from the trough by the draft or jerking of a fish in any direction and the stake or pin 11 holds the trough and socket out of the water. In such position the rod or pole may readily and conveniently be grasped by the fisherman and be lifted by him away from the trough for the purpose of playing or killing a fish on a hook on a line carried by said rod, or for rebaiting said hook, or for any other purpose. Notches 27 in lower end of socket 10 engage a pin 28 in the stake 11. The device can be folded into small compass for transportation or storage, the socket alining with and forwardly of the trough.

The device may be made of any suitable material and of any desired size and I do not desire to be understood as limiting myself to the form and construction shown, as the same may be modified in many particulars without departing from my invention.

I claim as my invention—

1. A fishing-rod holder, comprising a trough, means for retaining a rod in said trough, a socket, means for supporting said socket, a yoke on said socket on which said trough is pivoted, and adjusting means forming a connection between said trough and socket, said adjusting means comprising a lip on the socket, a rack pivoted on the trough and detachably engaging said lip, and a detent pivoted on the socket and detachably engaging said rack.

2. A fishing-rod holder, comprising a socket adapted to be detachably secured to a stake, said socket being formed with an upwardly extending fork, a trough pivoted between its ends to said fork, said trough being arranged for oscillation on an axis transversely of the fork, a rack pivoted to said trough between one end of the trough and the fork, said rack extending loosely through said fork and adapted to engage said socket, and means for locking the rack to said socket.

3. A fishing-rod holder, comprising a trough formed with a collar at one end and a fork at the opposite end adapted to retain a rod in said trough, said trough also being formed with ears on its opposite margins intermediate of its ends, said ears being adapted to engage a reel on said rod and prevent lateral oscillation of the rod in the trough.

4. In a fishing-rod holder, an improved article of manufacture having a trough formed with alining slots in its bottom, and also formed with a collar on one end and a constricting fork on the opposite end, said trough also being formed with opposing out-turned ears on and integral with its sides intermediate of the fork and collar, said trough being adapted for use with mounting means.

5. A fishing-rod holder having a trough adapted to contain the grip-piece of a fishing-rod, there being a reel mounted on said grip-piece, there being opposing out-turned ears formed on, integral with and wholly contained between the ends of the sides of the trough and adapted to engage wholly beneath and support said reel.

6. In a fishing-rod holder, a trough formed with a slotted bottom, in combination with a fishing-rod having a finger-piece adapted to extend through the slotted bottom.

7. In a fishing-rod holder, a trough formed with a slotted bottom, in combination with a fishing-rod having a finger-piece adapted to extend through the slotted bottom, said trough also being formed with opposing out-turned ears adapted to engage a reel on said fishing-rod in advance of said finger-piece.

8. In a fishing-rod holder, a stake, a pin mounted transversely through said stake, a socket mounted on said stake and formed with notches embracing said pin, a trough mounted on said socket, and means for securing a fishing-rod in said trough.

Signed by me at Des Moines, Iowa, this twenty-fourth day of November, 1916.

FRIEDRICH W. WITTKOWSKI.